J. C. HOLLANDS.
TEA KETTLE.
APPLICATION FILED MAY 15, 1912.
1,072,461.
Patented Sept. 9, 1913.
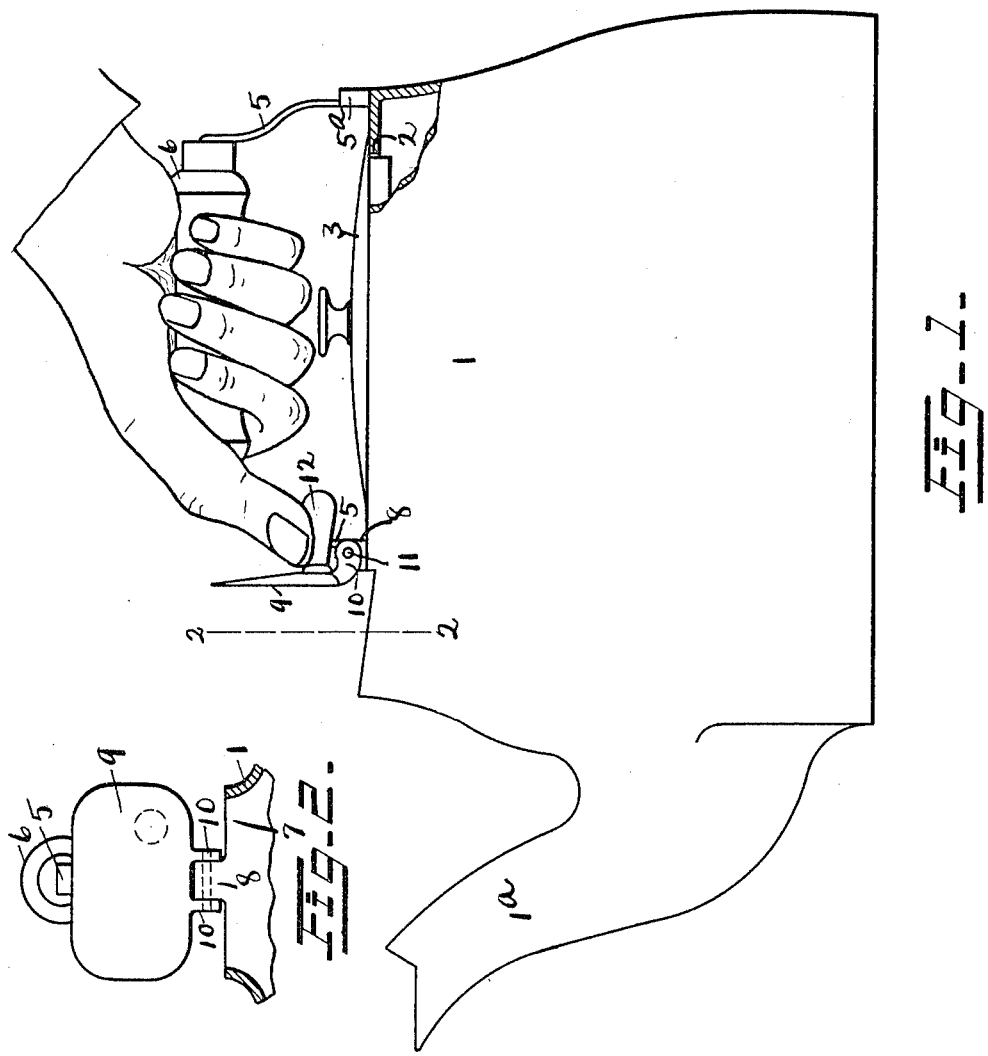
Witnesses
B. M. Hartman
U. C. Hess
Inventor
John C. Hollands
by R. L. ---
Attorney

UNITED STATES PATENT OFFICE.

JOHN C. HOLLANDS, OF ERIE, PENNSYLVANIA, ASSIGNOR TO THE GRISWOLD MANUFACTURING COMPANY, OF ERIE, PENNSYLVANIA, A CORPORATION OF PENNSYLVANIA.

TEA-KETTLE.

1,072,461.   Specification of Letters Patent.   Patented Sept. 9, 1913.

Application filed May 15, 1912.   Serial No. 697,451.

*To all whom it may concern:*

Be it known that I, JOHN C. HOLLANDS, a citizen of the United States, residing at Erie, in the county of Erie and State of Pennsylvania, have invented new and useful Improvements in Tea-Kettles, of which the following is a specification.

This invention relates to teakettles and consists in certain improvements in the construction thereof as will be hereinafter fully described and pointed out in the claims.

In the ordinary form of teakettles a cover is arranged at the top directly under the handle. In order to refill the teakettle, it is necessary to remove this cover. Where the liquid in the teakettle is very hot, the outrush of steam interferes materially with this operation.

One of the objects of this invention is to provide a teakettle in which this difficulty is obviated.

The invention is illustrated in the accompanying drawings as follows:—

Figure 1 shows a side elevation of the kettle partly in section. Fig. 2 a section of a fragment of the kettle on the line 2—2 in Fig. 1.

1 marks the body of the kettle in which there is arranged the usual opening 2. A cover 3 is provided for the opening 2. The handle is formed of the uprights 5 and the connecting grip piece 6 usually of wood. The uprights 5 are secured to the lugs 5ᵃ on the top of the kettle forming a rigid connection with the kettle. An auxiliary opening 7 is provided in the body of the kettle and in front of the upright 5ᵃ toward the spout 1ᵃ. A hinge lug 8 extends upwardly from the side of the opening 7 adjacent to the upright 5ᵃ. A cover 9 has the ears 10 which extend each side of the lug 8. The hinge pin 11 extends through the ears 10 and lug 8 forming a hinge connection for the cover. The cover is provided with the upright cover handle 12.

As clearly shown in Fig. 1, the operator grasping the grip piece 6 is in position to operate the cover 9 through the action of the thumb on the handle 12. It will be observed that the hand is entirely protected from any outrush of steam from the opening 7. The opening 7 is of ample size to permit of the filling of the kettle. The handle is also back of this opening so as not to interfere with the ready filling of the kettle through the opening 7.

The parts of the cover 9 especially in connection with the handle 12 are so weighted that when the cover is in its elevated position, it will remain open by gravity.

What I claim as new is:—

1. In a teakettle, the combination of a body having a spout and an opening back of the spout; a handle extending upwardly from the body, the front end of the handle being adjacent to the opening and at the opposite side of the opening from the spout; a cover for the opening, opening by a movement toward the handle; and means on the cover whereby the cover can be operated by an operator gripping the handle with the thumb side of the hand toward the spout.

2. In a teakettle, the combination of a body having a spout and an opening back of the spout; a handle extending upwardly from the body, the front end of the handle being adjacent to the opening and at the opposite side of the opening from the spout; a cover for the opening, opening by a movement toward the handle; and means on the cover whereby the cover can be operated by an operator gripping the handle with the thumb side of the hand toward the spout, the cover opening in a direction to deflect the steam from the opening from the operator actuating the cover.

3. In a teakettle, the combination of a body having a spout; an auxiliary opening back of the spout; a main opening back of the auxiliary opening; a handle extending upwardly from the body and across the main opening, the front end of the handle being adjacent to the auxiliary opening and at the opposite side of the auxiliary opening from the spout; a hinged cover for the auxiliary opening, said cover opening by a movement toward the handle; and means on the cover whereby the cover can be operated by an operator gripping the handle with the thumb side of the hand toward the spout.

4. In a teakettle, the combination of a body having a spout; a handle extending upwardly from the body, the front end of the handle being adjacent to the opening; a hinged cover for the opening, said cover swinging in its opening movement toward the handle; and means on the cover whereby the cover can be operated by an operator gripping the handle with the thumb side of the hand toward the spout, the cover forming a shield for the hand of the operator as it is opened.

5. In a teakettle, the combination of a body having a spout and an opening back of the spout; a handle extending upwardly from the body, the front end of the handle being adjacent to the opening and at the opposite side of the opening from the spout; a hinged cover for the opening, said cover opening by a movement toward the handle; and means on the cover whereby the cover can be operated by an operator gripping the handle with the thumb side of the hand toward the spout, said cover being balanced to remain in an open position when opened.

In testimony whereof I have hereunto set my hand in the presence of two subscribing witnesses.

JOHN C. HOLLANDS.

Witnesses:
B. M. HARTMAN,
H. C. LORD.

Copies of this patent may be obtained for five cents each, by addressing the "Commissioner of Patents, Washington, D. C."